United States Patent
Pearce et al.

(10) Patent No.: US 10,417,684 B2
(45) Date of Patent: Sep. 17, 2019

(54) WALL ART HANGING TEMPLATE

(71) Applicants: Christopher M. Pearce, New York, NY (US); Evelyn Lewinter, Sparta, NJ (US); Joellyn Gray, Darien, CT (US); James Dugan, Montvale, NJ (US); Alvin Scott, Rochester, NY (US); Andrew B. Cogbill, Brooklyn, NY (US)

(72) Inventors: Christopher M. Pearce, New York, NY (US); Evelyn Lewinter, Sparta, NJ (US); Joellyn Gray, Darien, CT (US); James Dugan, Montvale, NJ (US); Alvin Scott, Rochester, NY (US); Andrew B. Cogbill, Brooklyn, NY (US)

(73) Assignee: FUJIFILM NORTH AMERICA CORPORATION, Valhalla, NY (US)

( * ) Notice: Subject to any disclaimer, the term of this patent is extended or adjusted under 35 U.S.C. 154(b) by 265 days.

(21) Appl. No.: 15/253,837

(22) Filed: Aug. 31, 2016

(65) Prior Publication Data
US 2018/0060933 A1     Mar. 1, 2018

(51) Int. Cl.
G06Q 30/06          (2012.01)
(52) U.S. Cl.
CPC ..... G06Q 30/0621 (2013.01); G06Q 30/0643 (2013.01)
(58) Field of Classification Search
CPC .................................................. G06Q 30/0621
See application file for complete search history.

(56) References Cited

U.S. PATENT DOCUMENTS

| 5,601,431 A | 2/1997 | Howard |
| 6,215,502 B1 | 4/2001 | Ferguson |
| 6,618,955 B2 | 9/2003 | Rice |

(Continued)

OTHER PUBLICATIONS

T. Germer and M. Schwarz, Computer Graphics Forum, vol. 28 (2009), No. 8, pp. 2068-2078 (Year: 2009).*

(Continued)

*Primary Examiner* — Abby J Flynn
*Assistant Examiner* — Anna Mae Mitros
(74) *Attorney, Agent, or Firm* — Womble Bond Dickinson (US) LLP

(57) ABSTRACT

Dynamically generating a uniquely customized wall art hanging template to help a user hang one or more items of customized wall art as they appear in an electronic display based on the user's selections and product customizations. A user customizes an electronically generated layout of items of art resulting in curated layout of customized items that can be purchased and hung on a wall in accordance with a corresponding customized wall art template. To aid in the accurate hanging of items a uniquely generated wall art template includes customized outlines of each item of art together with customized marks that locate the proper positions for hanging each item to match the appearance of the curated layout in the electronic display. The customized outlines can include outlines of reference points in the room that help the user locate the proper positions for hanging each item to match the appearance of the curated layout in the electronic display.

12 Claims, 16 Drawing Sheets

(56) References Cited

U.S. PATENT DOCUMENTS

| | | | | |
|---|---|---|---|---|
| 6,880,259 | B1* | 4/2005 | Schultz | A47G 1/205 33/1 G |
| 7,092,966 | B2 | 8/2006 | McIntyre | |
| 7,277,572 | B2 | 10/2007 | MacInnes et al. | |
| 7,421,796 | B1 | 9/2008 | Deangelis-Morris | |
| 7,533,129 | B2 | 5/2009 | McIntyre | |
| 8,253,731 | B2 | 8/2012 | Hoguet | |
| 8,319,788 | B2 | 11/2012 | Buzyn et al. | |
| 8,806,332 | B2 | 8/2014 | Cok | |
| 8,913,301 | B2 | 12/2014 | Chinnici et al. | |
| 8,989,440 | B2 | 3/2015 | Klusza et al. | |
| 9,019,297 | B2 | 4/2015 | Buzyn et al. | |
| 9,179,102 | B2 | 11/2015 | Ptucha et al. | |
| 9,355,470 | B2 | 5/2016 | Merrell et al. | |
| 9,965,800 | B1* | 5/2018 | Pitstick | G06Q 30/0643 |
| 2001/0034668 | A1* | 10/2001 | Whitworth | G06Q 30/06 705/26.3 |
| 2001/0047250 | A1 | 11/2001 | Schuller et al. | |
| 2002/0124426 | A1* | 9/2002 | Dewberry | A47G 1/205 33/494 |
| 2003/0051255 | A1 | 3/2003 | Bulman et al. | |
| 2006/0080901 | A1* | 4/2006 | Wagner | A47F 10/00 52/36.1 |
| 2006/0195792 | A1 | 8/2006 | Burnett et al. | |
| 2007/0143082 | A1* | 6/2007 | Degnan | G06T 11/60 703/1 |
| 2010/0141552 | A1 | 6/2010 | Ferlitsch et al. | |
| 2011/0029914 | A1 | 2/2011 | Whitby et al. | |
| 2011/0157227 | A1 | 6/2011 | Ptucha et al. | |
| 2012/0166299 | A1 | 6/2012 | Heinstein et al. | |
| 2013/0073420 | A1 | 3/2013 | Kumm et al. | |
| 2013/0093782 | A1 | 4/2013 | Wakefield et al. | |
| 2013/0201210 | A1 | 8/2013 | Vaddadi et al. | |
| 2014/0096404 | A1 | 4/2014 | Chen | |
| 2014/0132633 | A1 | 5/2014 | Fekete et al. | |
| 2014/0259718 | A1* | 9/2014 | Mehra | A47G 1/205 33/562 |
| 2014/0298209 | A1 | 10/2014 | Gil et al. | |
| 2015/0177960 | A1 | 6/2015 | Topakas et al. | |
| 2016/0179315 | A1 | 6/2016 | Sarao et al. | |

OTHER PUBLICATIONS

Shutterfly, "Design-a-Wall", https://www.shutterfly.com/design-a-wall/, accessed on Apr. 26, 2016.
Sutterfly, "Design a Wall Arrangements", https://cdn.staticsfly.com/i/daw/shutterfly_design-a-wall_arrangements.pdf, accessed Apr. 26, 2016.
PCT Application No. PCT/US2017/049621, Notification of Transmittal of the International Search Report and the Written Opinion, dated Nov. 8, 2017, 15 pgs.
PCT/US2017/049621 Notification of Transmittal of International Search Report and Written Opinion dated Nov. 8, 2017, 9 pages.
International Preliminary Report on Patentability received for PCT Patent Application No. PCT/US2017/049621, dated Mar. 14, 2019, 7 pages.

* cited by examiner

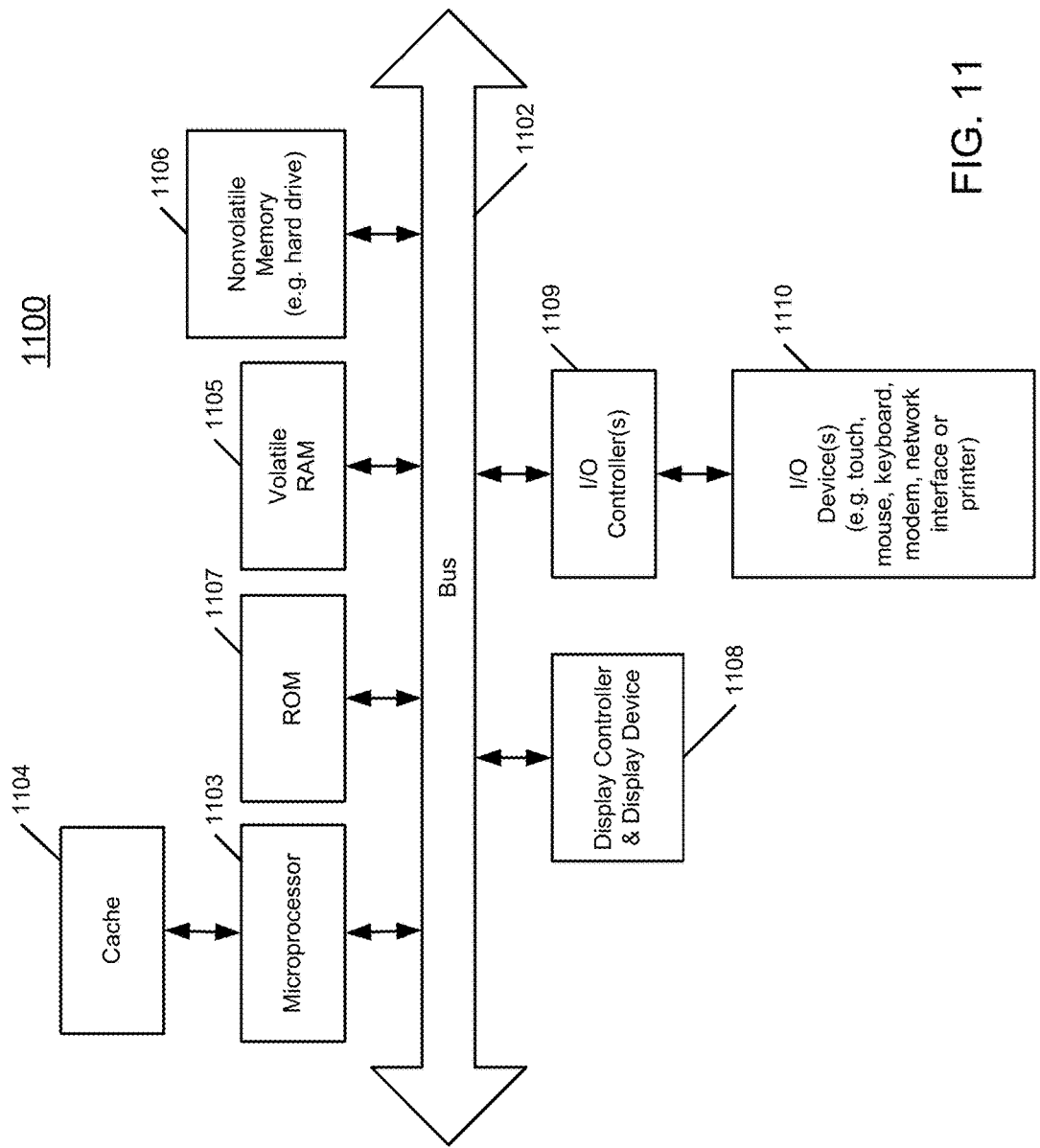

WALL ART HANGING TEMPLATE

TECHNICAL FIELD

The technical field is generally related to computer systems, and in particular computer systems that facilitate the hanging of wall art.

BACKGROUND

Today there are numerous internet-based services for purchasing art and photographic prints, such as ordering from art gallery websites, consumer photo websites and in-store consumer photo kiosks. These services take advantage of the ability to browse, select and customize digital photographs or images of paintings and other visual art in preparation for generating an order for a print, poster, framed art and the like.

As with any consumer product, however, it can be difficult for the consumer to know whether the product is the proper size, color or style and the like to complement their home's décor, and difficult to hang the art properly on the wall of their home or office once purchased. Consumers invest valuable time and money in making a purchase of a custom framed photo or other art that is typically not refundable should the purchase be less than satisfactory.

SUMMARY

Methods, systems, apparatus, and machine-readable media facilitate hanging wall art. A wall art system dynamically generates a uniquely customized wall art template for hanging a layout of one or more items of wall art as they appear in an electronic display of a user device, where the electronic display simulates the actual dimensions and appearance of user-customized wall art relative to a wall art environment when viewed with the user's device.

In one embodiment, the uniquely customized wall art template is printed or otherwise applied to a flexible and reusable material suitable for temporarily affixing to a surface, such as a physical wall. The completed uniquely customized wall art template can be sent to a user along with the one or more items of art to aid the user when hanging the items on a surface, such as a wall in their home or office, so that the items are hung to match the layout and appearance of the wall art relative to the wall art environment when viewed with the user's device.

In one embodiment, the wall art system generates the uniquely customized wall art template for the one or more items of wall art by generating outlines of the actual dimensions of each of the one or more items in the layout as they appear in the electronic display of the user device.

In one embodiment, the wall art environment relative to which the wall art appears on the electronic device can include images of furnishings or other features. The wall art system can dynamically generate the uniquely customized wall art template with the outlines of the actual dimensions of the furnishings or other features of the wall art environment to serve as reference points when using the generated wall art template to hang the one or more items of wall art as they appear in the electronic display of the user device.

In one embodiment, the wall art system generates the uniquely customized wall art template with additional information about the one or more items of wall art, including the overall dimensions of the layout, fixing positions for the nails, screws, or other mechanisms used to affix the items to a surface, the title of the art selections of each item, the product style of each item, e.g., canvas, metal print, mounted print, framed print, acrylic print, and so forth. Additional information can also include tools required for hanging the various items of art for the particular product styles as well as guidelines for leveling the wall art template to insure accurate placement on the surface upon which the items are to be hung.

Corresponding methods, systems, apparatus, and machine-readable media for interfacing with the user device can be implemented in servers supporting the user device and in servers for generating the uniquely customized wall art template with the wall art system.

BRIEF DESCRIPTION OF THE DRAWINGS

The present invention is illustrated by way of example and not limitation in the figures of the accompanying drawings, in which like references indicate similar elements and in which:

FIG. 11 is a block diagram overview of a computer system or device, which may be used with an embodiment of the invention.

DETAILED DESCRIPTION

Figure 1:
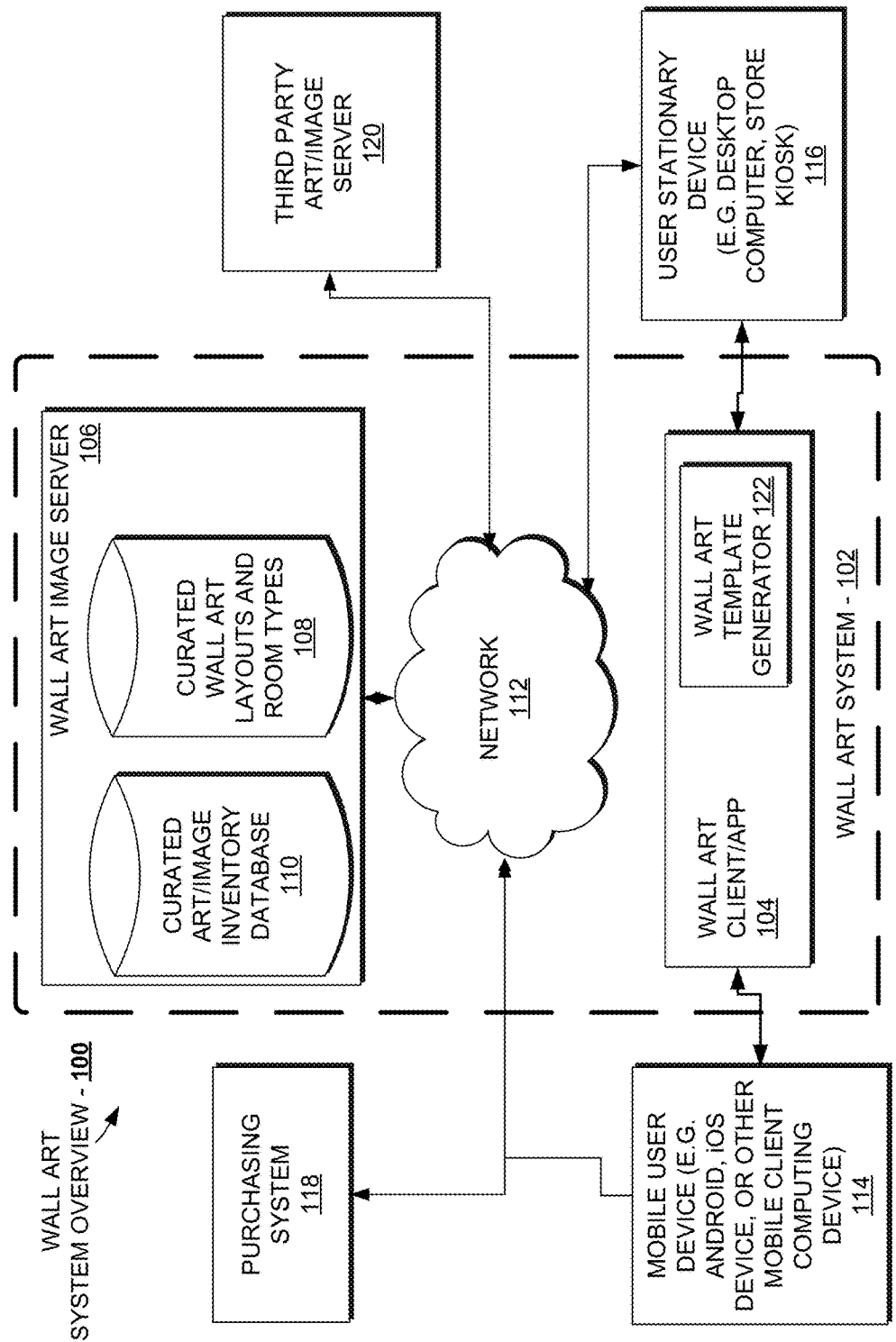
FIG. 1 illustrates an overview of an embodiment of a wall art system for generating a wall art template in an operating environment.

In keeping with the foregoing observations, a novel wall art system for generating a wall art template is described in which a client operates in conjunction with a server or servers to dynamically generate a uniquely customized wall art template that can be used to help a user hang one or more items of art as they appear on an electronic display of the client device. A user customizes the appearance of the one or more items of art in the electronic display and the wall art template is dynamically generated to match the unique user-customization of the appearance of the one or more items of art.

In one embodiment, each wall art template is dynamically generated based on the user's unique and customized selection of the item(s) of wall art, including identifying the name of the user-selected item(s) of wall art, each item's product style, product size, the relative position of each item to the other items or other reference points, mounting/fixing positions for each item and overall dimensions of the wall art as hung in the wall art space.

In one embodiment, the electronic display simulates the actual dimensions and appearance of one or more items of wall art relative to a wall art environment when viewed with a client graphical user interface (GUI), such as a user device equipped with an electronic display.

In one embodiment, the electronic display simulates the actual dimensions and appearance of one or more items of art through a wall art system that facilitates user selection, purchase of art suitable for hanging on a wall using a wall art environment generated and displayed in the client's GUI, such as the wall art system described in a co-pending and commonly assigned patent application U.S. application Ser. No. 15/061,927 entitled "Wall Art System", the contents of which are incorporated herein by reference.

In one embodiment, the one or more items of art includes any photographic or other visual images for which a physical instantiation can be produced, such as a framed photograph or artwork, and is referred to herein as "wall art."

In one embodiment the wall art environment generated in the GUI comprises a view of a furnished room, wherein the user is prompted to take the photo of the furnished room with the user device in a manner that allows a measurement of a size of the furniture in the room to be used to ensure that the furniture is properly positioned in the photo to the scale of the wall art environment for use with the visual representation of the curated layout of items of wall art.

In an alternative embodiment, the wall art environment generated in the GUI comprises an image of a wall and furniture based on one of a variety of predefined room types in which a predefined measurement of the size of the furniture in the predefined room type is used to scale the wall art environment for use with the visual representation of the curated layout of items of wall art. In one embodiment, the user device prompts the user to select the color of the wall and/or the room type.

Whether the wall art environment comprises the wall and furniture from user's photo of the furnished room or from one of the predefined room types, in one embodiment, the user is prompted to select, purchase and/or customize the curated layout of items in the context of the wall art environment.

In one embodiment, the curated layout of items of art or images is positioned on the wall above the top edge of the furniture to simulate the actual dimensions and appearance of wall art relative to the scaled wall art environment. For example, the items containing the wall art and the overall size of the curated layout is displayed in proportion to the scale of the of the wall art environment so that the curated layout of items simulates the actual dimensions and appearance of wall art relative to the actual size of the furniture as depicted in the scaled wall art environment.

In one embodiment, the novel wall art system generates the wall art template from the user's unique selections and customization of wall art in the context of the wall art environment, including generating outlines of the actual dimensions of each of the one or more items in the curated layout as they appear in the electronic display of the user device.

In one embodiment, the wall art system can generate the unique and customized wall art template with the outlines of the actual dimensions of existing wall art already hung in the wall art environment, architectural features, furniture or other features of the wall art environment to serve as reference points when using the generated wall art template to hang the one or more items of wall art as they appear in the electronic display of the user device.

In one embodiment, the wall art system generates the unique and customized wall art template with additional information about the one or more items of wall art, including the overall dimensions of the layout, fixing positions for the nails, screws, or other mechanisms used to affix the items to a surface, the title of the art selections of each item, the product style of each item, e.g., canvas, metal print, mounted print, framed print, acrylic print, and so forth. Additional information can also include tools required for hanging the various items of art for the particular product styles as well as guidelines for leveling the wall art template to insure accurate placement on the surface upon which the items are to be hung.

The client may be implemented on a variety of platforms for user devices, such as a mobile application on a mobile device using a mobile operating system such as the iOS or Android operating systems, or on a browser-based application on a stationary or mobile device using a Microsoft Windows or MAC OS/X operating system. The one or more wall art servers and databases may be implemented on a variety of server platforms, and in particular implemented in a cloud-based storage platform to facilitate access by the client.

In one embodiment, the client is configured to receive the curated layouts of the wall art environment. The curated layouts are typically predefined in the wall art system to appeal to a wide number of users. For example, in one embodiment, the curated layouts contain a collage of one to eight or more items, each item bounded by four sides in the shape of a square or rectangle. The curated layouts are predefined to accommodate different configurations of photos or art in a pleasing arrangement that appeals to most users. In one embodiment the predefined curated layouts are static, but may be updated from time to time to reflect user demand.

In one embodiment, other shapes of items may be employed and/or the curated layouts may be dynamically updated to suit the user's preference or as dictated by the operator of the wall art system. In one embodiment, the wall art system may provide multiple versions of a curated layout for the same number of items, such as one curated layout containing six items arranged asymmetrically and another curated layout containing six items arranged symmetrically in different configurations.

In one embodiment, the client is configured to receive a variety of predefined room types to use for the wall art environment. The room types are typically predefined in the wall art system to contain images of colored walls and different types of furniture for users to visualize wall art in juxtaposition with the furniture in a room. The room types include the types of rooms that are commonly found in a home or office, such as a bedroom, a living room, conference room and the like.

In one embodiment, the furniture contained in the images includes furniture such as a couch for a living room, a table and chairs for a dining room, and the like. The image of a room type typically depicts a two-dimensional front view of the furniture projected to the view plane and the image of the furniture typically is positioned to appear in the lower half of the wall art environment GUI to allow room for a curated layout. The curated layout can be positioned on the wall at a suitable distance above the topmost edge of the front view of the furniture in the room type image, such as above the top edge of the couch.

In one embodiment, the predefined room types are static, but may be updated from time to time to reflect updated styles or particular types of furniture, or in response to user demand. In one embodiment, other room type images may be employed and/or the room types may be dynamically updated to suit the user's preference or as dictated by the operator of the wall art system.

In one embodiment, the interactive GUI is typically displayed on the user's mobile device client. In addition, or alternatively, an interactive GUI can be displayed to the user on a different device, such as a laptop, PC, or other stationary device, including a consumer photo kiosk operating in a merchant store. The interactive GUI can take different forms depending on the user device operating system platform on which it is activated, ranging from applications operating on mobile device platforms to web-based browser applications.

In one embodiment, a user can select not only photos from their own device, but also photos stored in social media accounts to which their device has access. In one embodiment, a user can select art from a curated art/image inventory database curated on behalf of all users and hosted by the operator of the wall art system. Alternatively, the user can select art from a third party art/image server in cooperation with the wall art system.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions, which follow, are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relates to apparatus for performing the operations described herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below.

The processes or methods depicted in the figures described herein are performed by processing logic that can comprise hardware (e.g. circuitry, dedicated logic, etc.), software (e.g., embodied on a non-transitory computer readable medium), or a combination of both. Although the processes or methods are described in terms of some sequential operations, it should be appreciated that some of the operations described may be performed in a different order. Moreover, some operations may be performed in parallel rather than sequentially.

In addition, embodiments of the present invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; non-transitory media, etc.

FIG. 1 illustrates of an overview 100 of an exemplary wall art system 102 in an operating environment in accordance with embodiments of the invention. The system 102 includes, among others, components to support the operation of a wall art client/app 104 operating on any of mobile user device 114 or user stationary device 116 in conjunction with a wall art image server 106. The wall art client/app 104 includes a wall art template generator 122 to interoperate with the server 106 to generate the wall art template after the user has selected and generated a customized selection of wall art for purchase with the wall art system 102. The server 106 communicates with the client 104 over a network 112. The wall art system 102 further interoperates with a purchasing system 118 and third party art/image, i.e. wall art, server 120 to facilitate the selection and purchase of wall art products by a user as well as the generation of the wall art template to help the user hang the wall art as selected and customized using the wall art system. The content of the server 106 and client 104 is accessible remotely over the network 112 by authorized users.

In a typical environment, the client 104 is implemented as an application running on a mobile user device 114 or any other type of computing device having an interactive touch screen display and a mobile operating system, such as an iOS or Android operating system. The client application 104 running on the mobile user device 114 provides the user with an easy-to-use touch interactive GUI to securely access and interact with the wall art image server 106 and curated art/image inventory database 110, purchasing system 118 and/or third party art/image server 120 as needed.

In some embodiments, the client 104 can also be implemented on either a mobile or stationary user device 120 having a web-browser platform to enable the client 104 to interact with the server 106 for secure online access to content stored on the wall art image server 106, curated wall art layouts and room types 108 and curated art/image inventory database 110, purchasing system 118 and/or third party art/image server 120 in a manner similar to the application running on the mobile user device 114.

During operation, the wall art system 102 further interfaces with a variety of proprietary or non-proprietary art/image servers from which wall art images and wall art products may be obtained, such as the aforementioned third party art/image servers, or third-party merchant/purchasing system 118.

Figure 2:
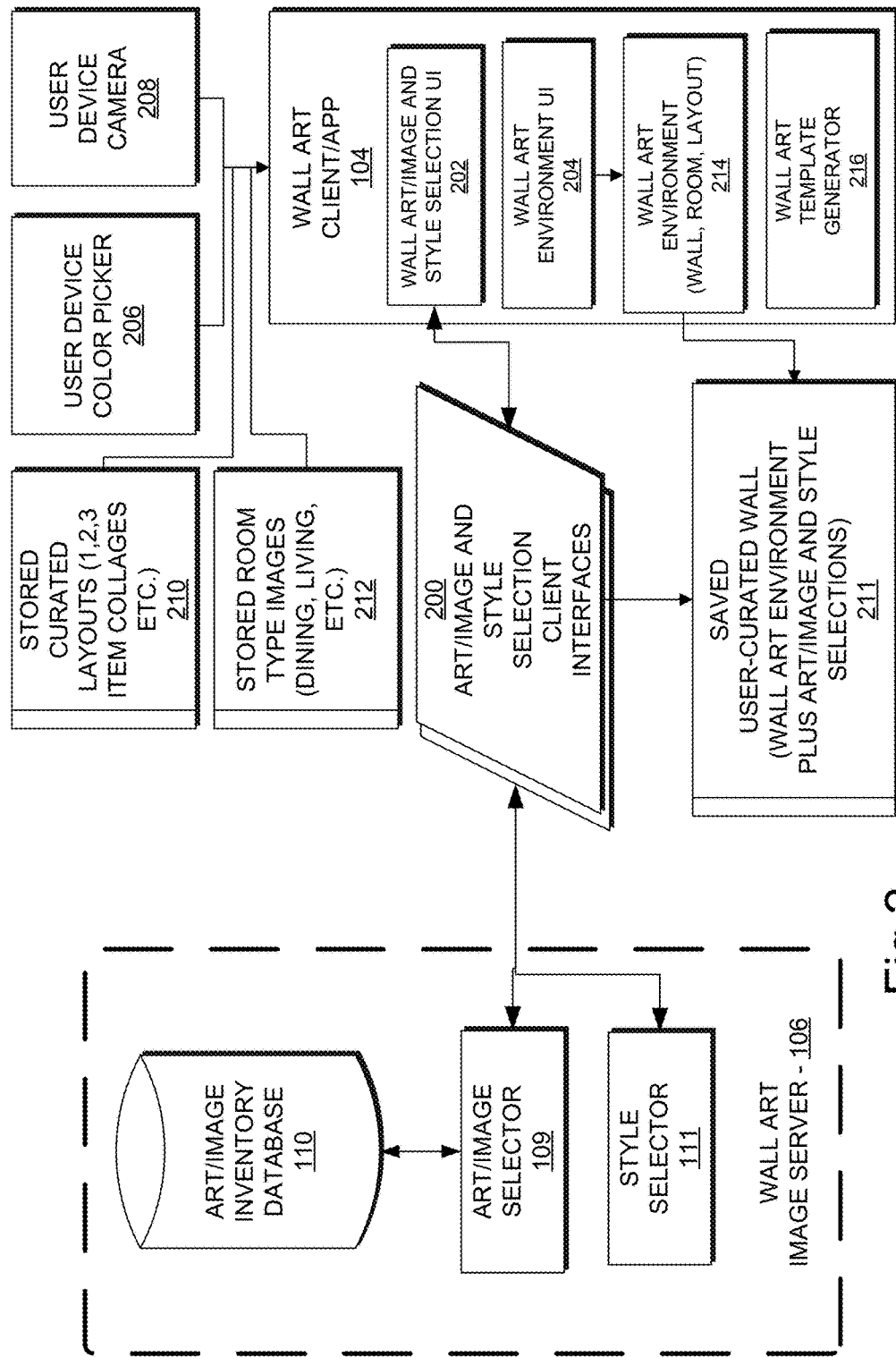
FIG. 2 illustrates an overview of the wall art system for generating a wall art template of FIG. 1 in further detail in accordance with embodiments of the invention.

FIG. 2 illustrates the exemplary wall art system of FIG. 1 in further detail in which the wall art image server 106 interfaces with the wall art client/app 104 for selecting and customizing photos and art using art/image and style selection client interfaces 200 and corresponding wall art image and style selection UI 202. The wall art image server 106 includes and art/image inventory database 110 and corresponding server components for art/image selection 109 and style selection 111.

In one embodiment, the wall art client app 104 further includes a wall art environment GUI 204 and interoperates with a user device color picker 206 and user device camera 208 and the stored curated layouts 210 and stored room type images 212 of furniture as previously received and stored on the user device from the wall art system 102, or alternatively obtained on demand from the wall art system.

In operation the wall art environment GUI 204 generates the wall art environment 214 that forms the context within which the wall art/image and style selection GUI is performed. In one embodiment, the wall art client/app 104 also saves and stores the curated wall 211 as customized by the user during the selection and customization 202 of their wall art for sharing with other users and/or for regenerating the wall art environment 214 and curated layout selections and customization for future use.

In one embodiment, the wall art client/app 104 (FIG. 1) and wall art template generator 122 (FIG. 1)/216 (FIG. 2) interoperate with the purchasing system 118 (FIG. 1) to dynamically generate a customized and reusable wall art template to help the user hang the wall art in their home or office to match the appearance of the curated wall 211 as customized by the user in relation to the wall art environment 214.

Figure 3:
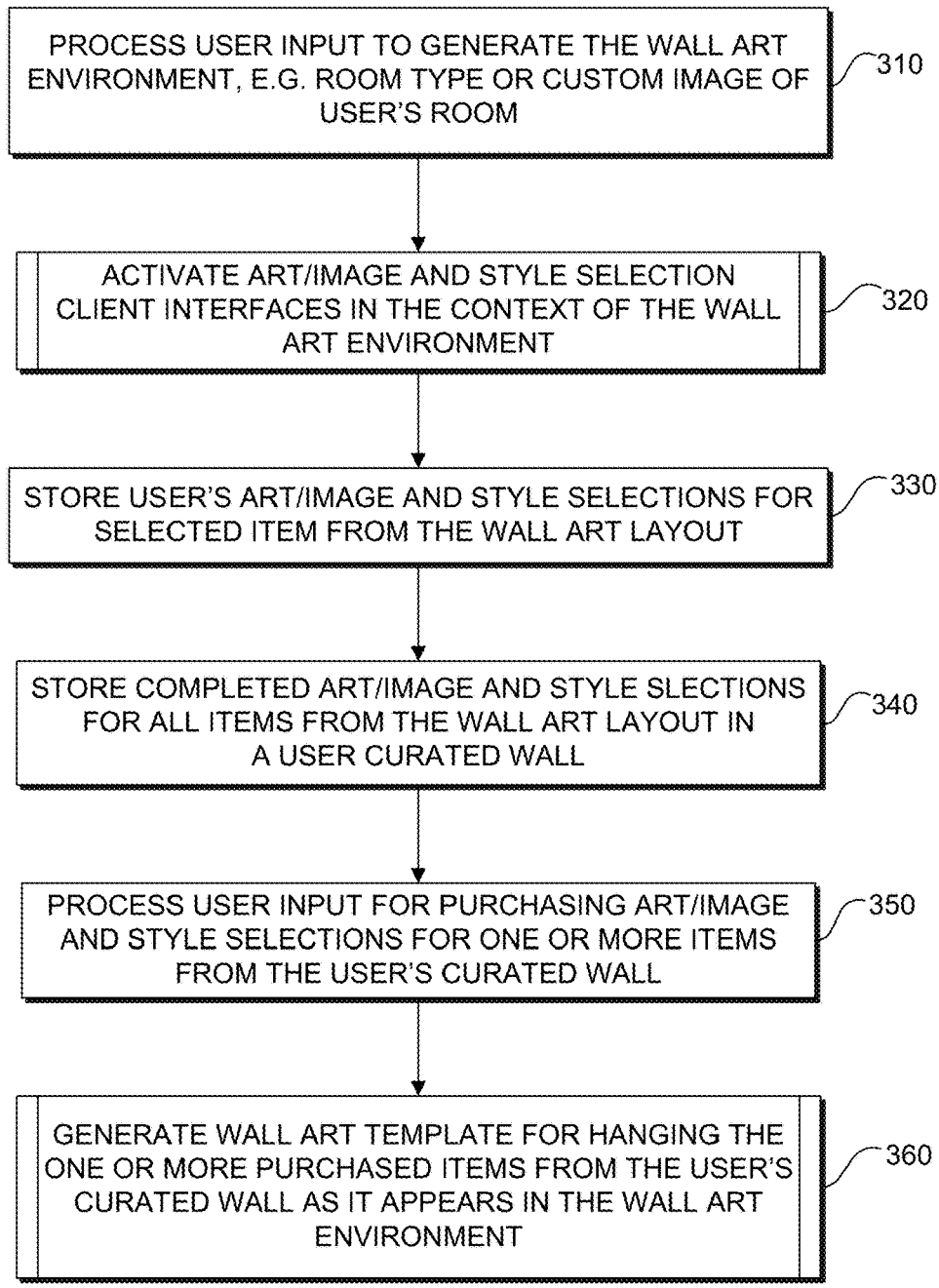
FIGS. 3-4 are flow diagrams illustrating processes that may be utilized in a user device to operate a client in conjunction with a server in accordance with embodiments of the invention.

FIG. 3 is a flow diagram illustrating the processes 300 that may be utilized in a user device 114/116 to operate a client 104 in conjunction with a server 106 in accordance with embodiments the wall art system for generating a wall art template 102. The processes 300 carried out on the user device include a process 310 to generate the wall art environment, such as the room type or custom image of the user's furnished room. In one embodiment, the processes 300 further include a process 320 to activate the art/image and style selection interfaces to customize the one or more items of art in the context of the wall art environment, as well as processes 330 and 340 to store the results of the wall art environment, art/image and style selections in a user curated wall, all of which are described in detail with reference to co-pending and commonly assigned U.S. application Ser. No. 15/061,927 entitled "Wall Art System."

To dynamically generate the wall art template, the processes 300 include a process 350 to receive and process the user input for purchasing products corresponding to the one or more items from the user's curated wall (the customized art/image/photo and style selections) and, finally, the process 360 to generate the wall art template for hanging the one or more purchased items as they appear in the context of the wall art environment, described in greater detail with reference to FIG. 4.

Figure 4:
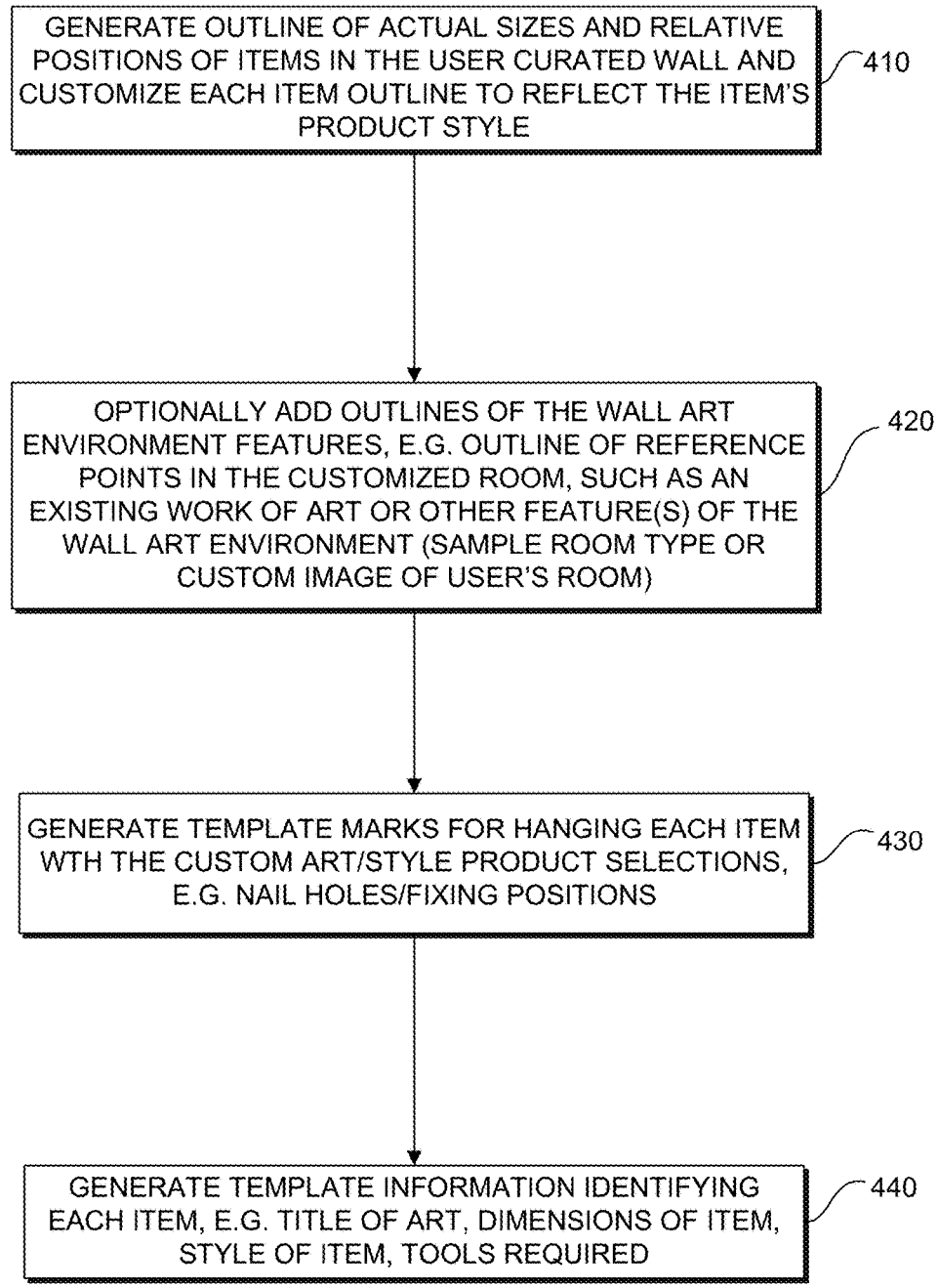

FIG. 4 is a flow diagram illustrating additional processes 400 that may be utilized in a user device 114/116 to operate a client 104 in conjunction with a server 106 in accordance with embodiments the wall art system for dynamically generating a unique and customized wall art template 102.

As illustrated, the processes 400 include a process 410 to generate the outline of actual sizes and relative positions of the one or more items in the user's curated wall. In one embodiment, process 420 optionally adds outlines of the wall art environment features that may help the user to properly position the wall art template in relation to the furniture or other distinguishing features in their room that can be captured in the wall art environment. For example, the process 420 can add outlines of certain reference points in a room, such as certain architectural features of the room, wall trim, door openings, or the furniture and so forth as depicted in the custom photo of the user's room or in the default sample room types, either of which were used to generate the wall art environment.

In one embodiment, process 430 generates template reference marks for hanging each item on a wall, where the marks include any visible indicia that guide the user where to locate nail holes or other fixing positions to affix an item to a surface, such as wall in the user's home or office. In one embodiment, a position and type of the mark relative to the outline of the item reflects the custom art/style product selections for that item. For example, if the item is a wood-frame mounted item the number of and locations of the nail holes or other fixing positions may be different than the locations for a canvas or metal item. Similarly, if the item is a small or lightweight item the number of and locations of the nail holes or other fixing positions may be different that the locations for a large or heavyweight item.

In one embodiment, process 440 generates additional template information identifying each item to be hung with the assistance of the template, such as the title of the art selection, the dimensions of the item, the product style of the item, the tools required for hanging the items, and guidelines for accurately affixing the wall art template to a vertical surface such as a wall using a level.

In a typical embodiment, once the outlines, marks and additional information has been generated for the wall art template, the wall art system prints or otherwise produces the wall art template on a reusable flexible material suitable for mailing/shipping to a user along with their purchased items. In a typical embodiment, the reusable flexible material is a single sheet of paper or other material that is large enough to accommodate the entire curated layout of items and flexible enough to fold or roll into a flat envelope or cylindrical shipping container.

Figure 5A:
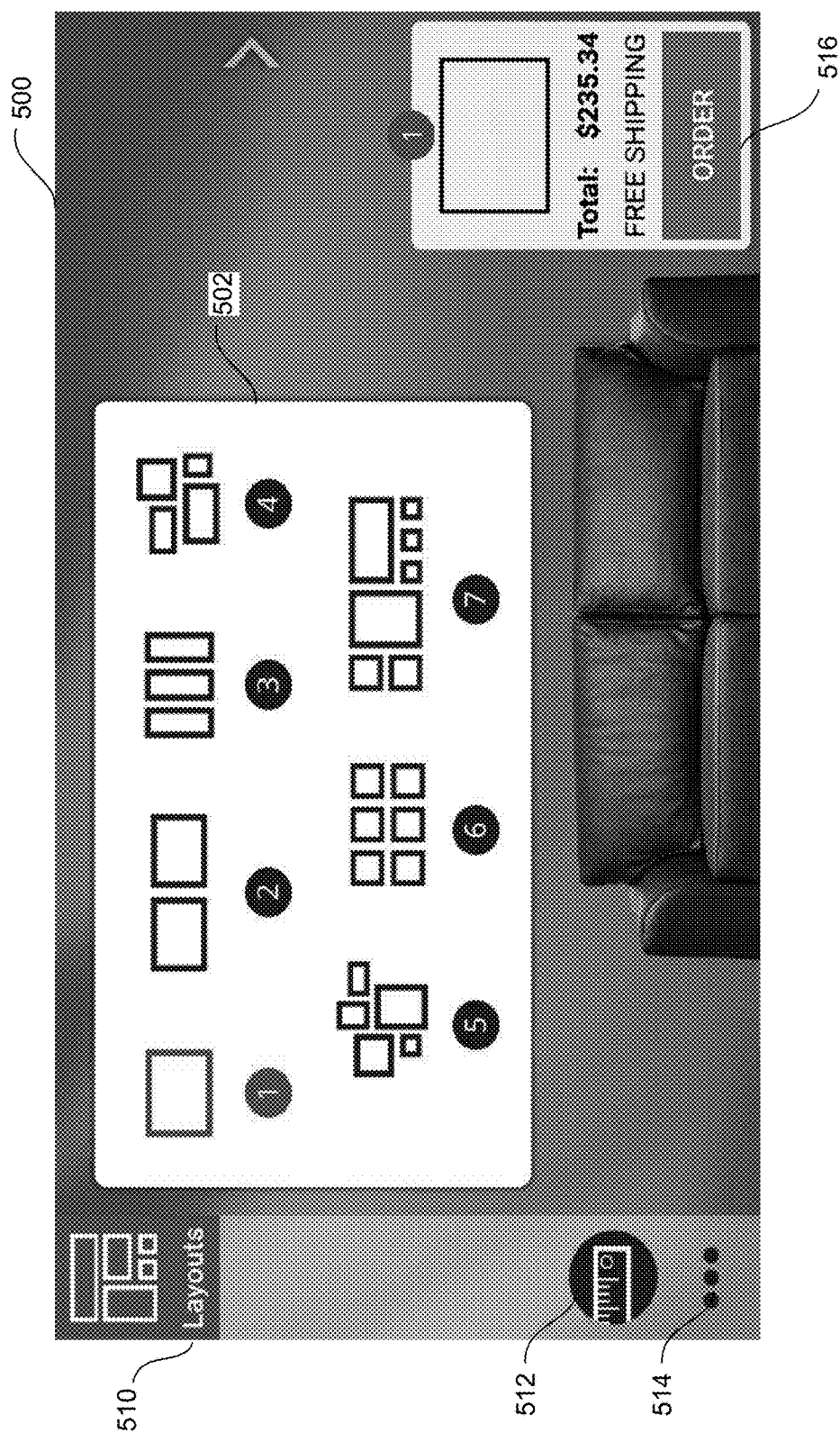
FIGS. 5*a*-5*f* illustrate examples of a user device client graphical user interface (GUI) implemented on a display device including several exemplary views of the GUI for selecting and displaying an electric display of a curated layout of one or more items in a wall art environment.
Figure 5B:
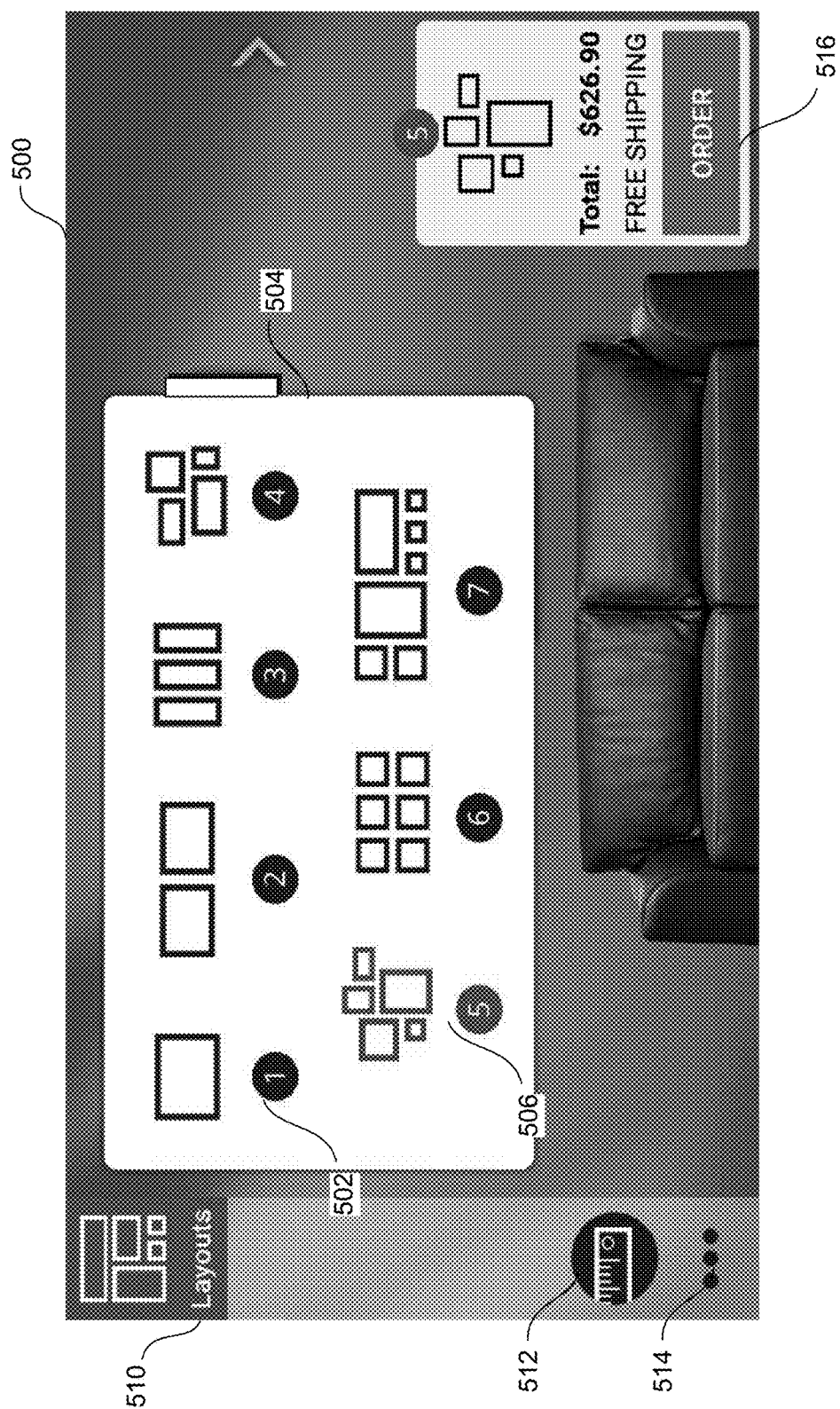

In the following paragraphs, FIGS. 5a-5f will be described. Each of these figures illustrate examples of a user device client graphical user interface (GUI) implemented on a user display device as described in accordance with embodiments of the invention as follows:

In one embodiment, once the wall art environment is complete, such as described in co-pending and commonly assigned patent application Ser. No. 15/061,927, then the user is ready to select a curated layout as illustrated in FIGS. 5a-5f. For example in FIG. 5a, the user is prompted in GUI 500 with a choice of menu items 510, 512 and 514, representing a collage layout selector 510 and ruler interface 512 and a application interface 514. In one embodiment, when the collage layout selection menu item 510 is selected, the user is further prompted to select an icon from a group of icons 510 representing the arrangement of the collage of items. Thus, if a user wants a curated layout of 5 items, then he selects the icon showing 5 items, and so forth. As can be seen in FIG. 5b, as the user selects the new icon showing 5 items (instead of the default selection of a single item illustrated in FIG. 5a), the background wall of the wall art environment dynamically updates to reflect the new selection, in this case going from one item to five items as reflected in the arrangement of the collage of items displayed on the background wall (partially obscured in FIG. 5b by icon group 510) and in the shopping interface 516.

Figure 5C:
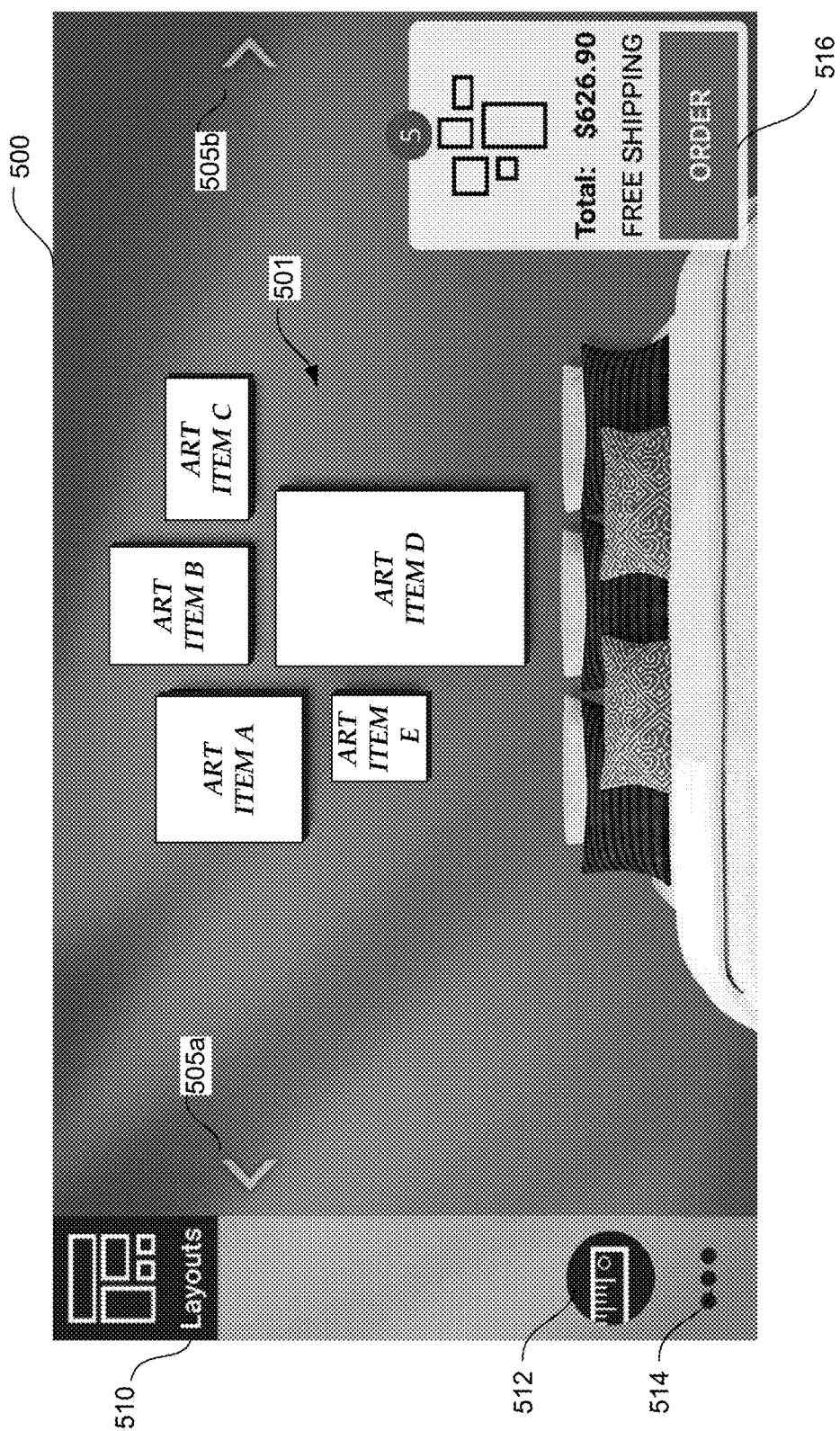
Figure 5D:
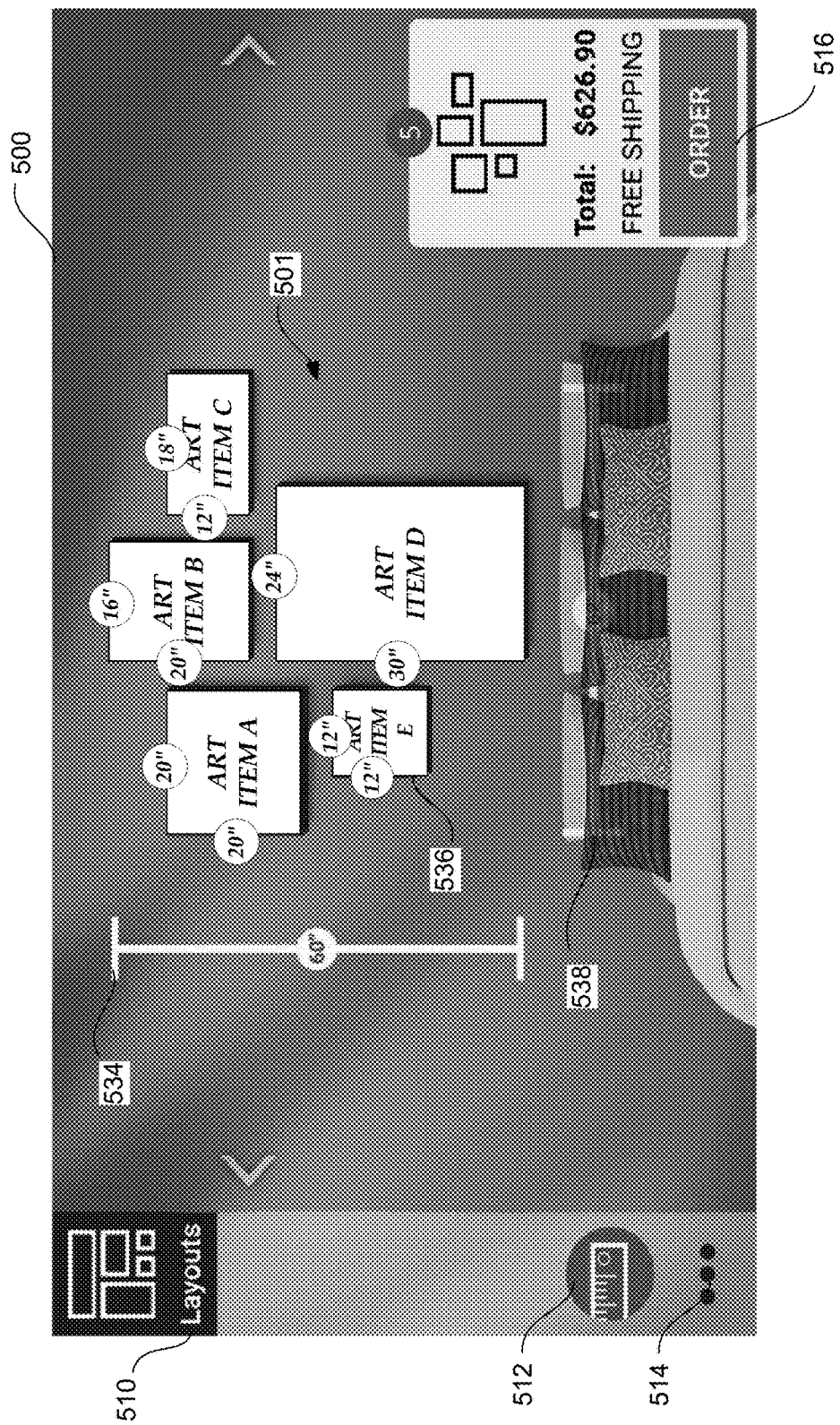
Figure 5E:
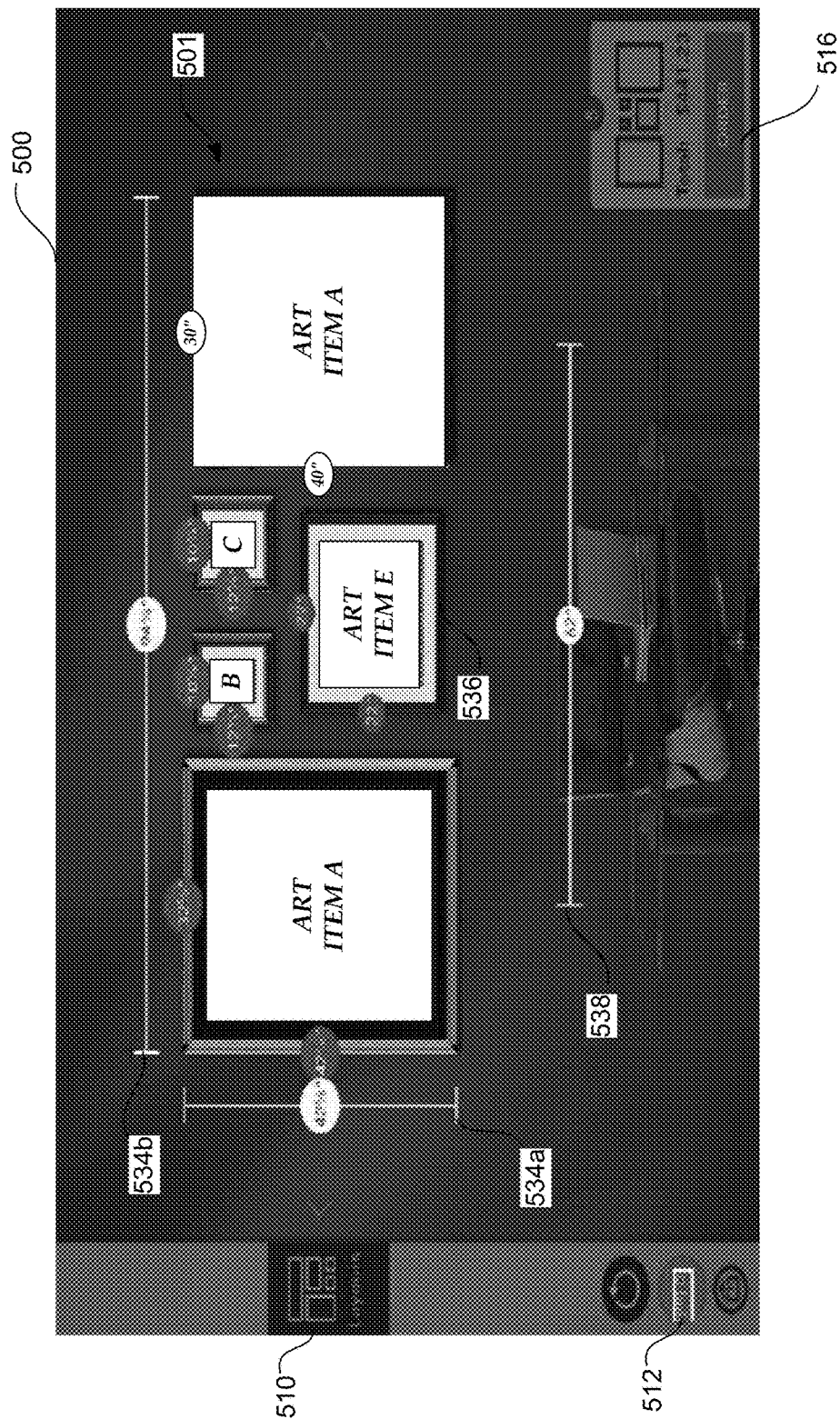
Figure 5F:
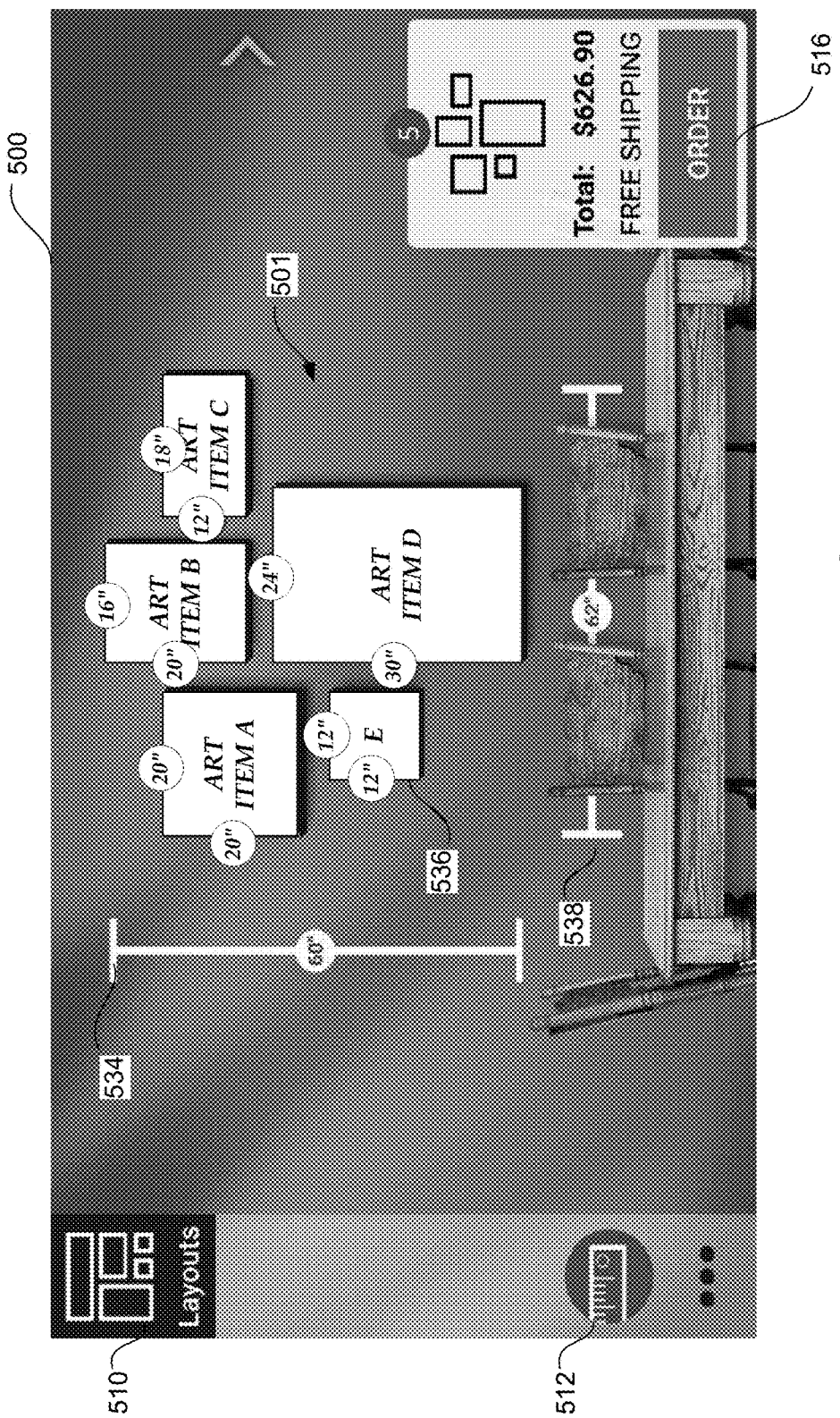

In one embodiment, in FIG. 5c, the display of the GUI 500 reveals that a curated layout containing a 5-item collage has been selected; the selected curated layout 501 is displayed centered over and in proportion to the scale of the measured width of the furniture. In one embodiment, swiping icons 505a/505b prompt the user to select different sample room furniture (unless the user has generated a customized wall art environment using the camera interface described with reference to FIG. 4a-6). In FIG. 5d, the ruler graphic 534/538 has been activated using the ruler menu item 512 by the user so that the actual dimensions of the items 536 (in inches or any other measurement unit) as well as one or more of the overall actual dimensions (e.g. the height) 534 of the curated layout 501 can be compared to the actual size (e.g. width) 538 of the furniture item in the foreground, in this case a bed. This allows a user to determine whether the actual dimensions of the curated layout relative to the actual dimensions of the furniture is acceptable, or whether a different curated layout might be preferable, such as the alternative curated layout shown in FIG. 5e (and in which the room selection is now a desk) i.e. curated layout 501, a collage of 6 items, or what a different combination of room type and curated layout might look like as shown in FIG. 5f, where the room selection is now a dining table and the curated layout 501 is still the collage of 5 items.

Figure 6:
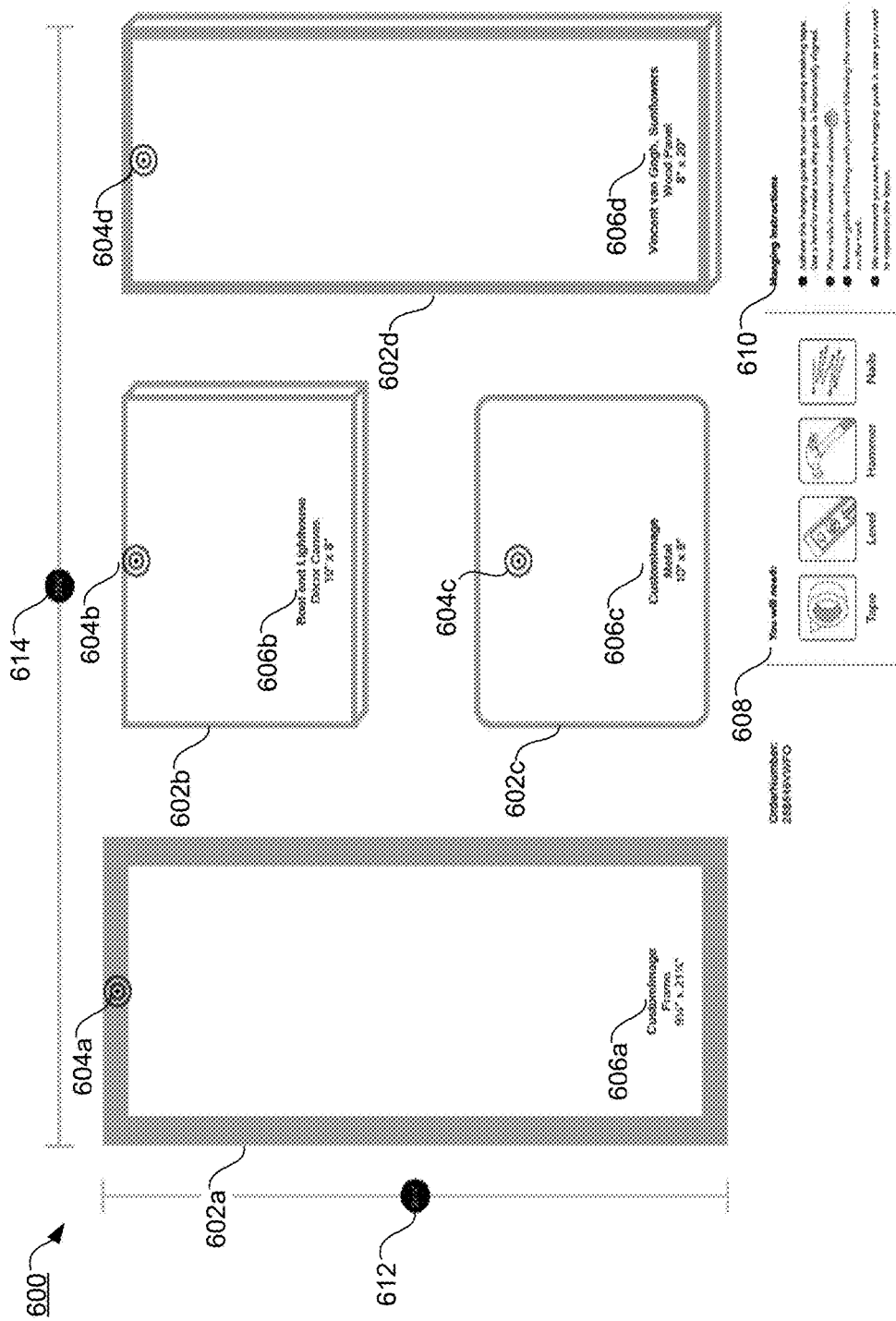
FIG. 6 illustrates an exemplary wall art template generated in accordance with embodiments of the invention.
Figure 7A:
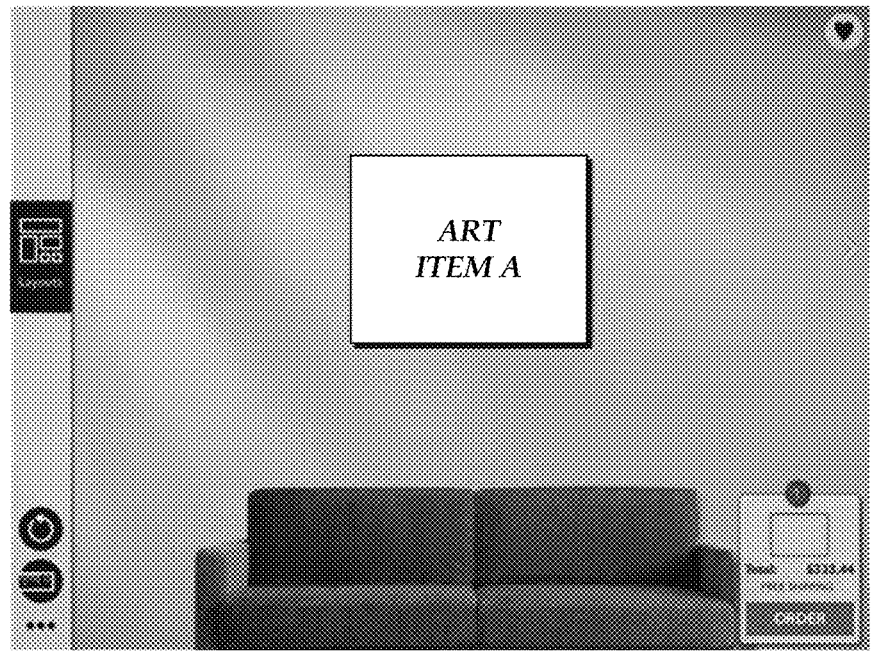
FIGS. 7A-7B, 8A-8B, 9A-9B, and 10A-10B illustrate additional exemplary wall art templates generated in accordance with embodiments of the invention.
Figure 7B:
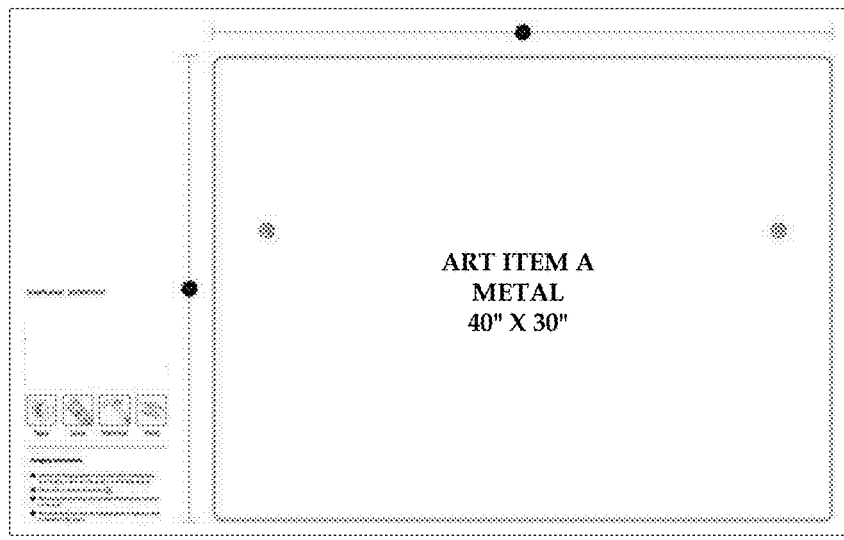
Figure 8A:
Figure 8B:
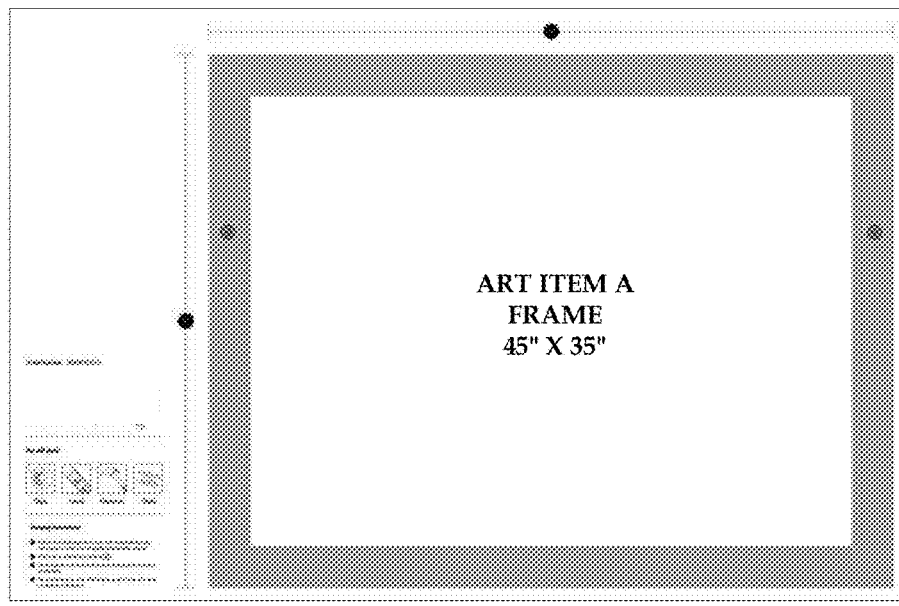
Figure 9A:
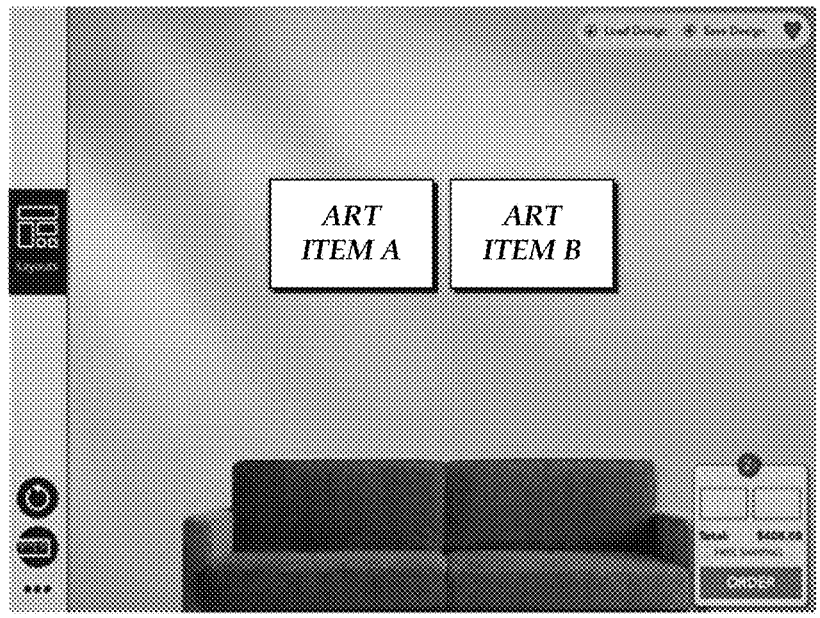
Figure 9B:
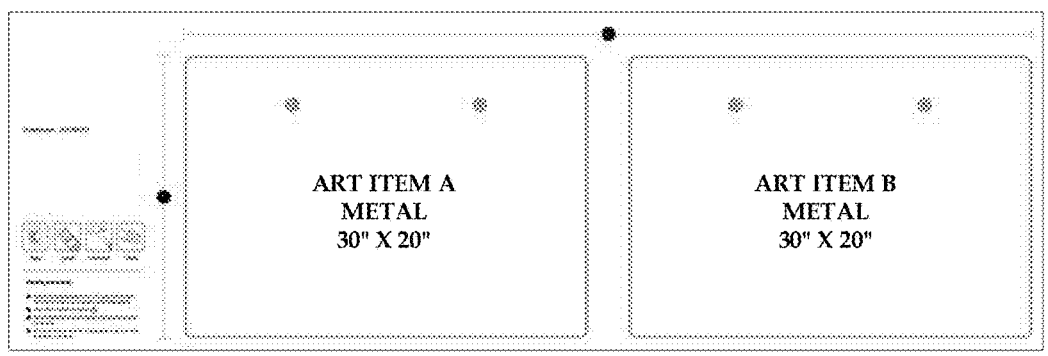
Figure 10A:
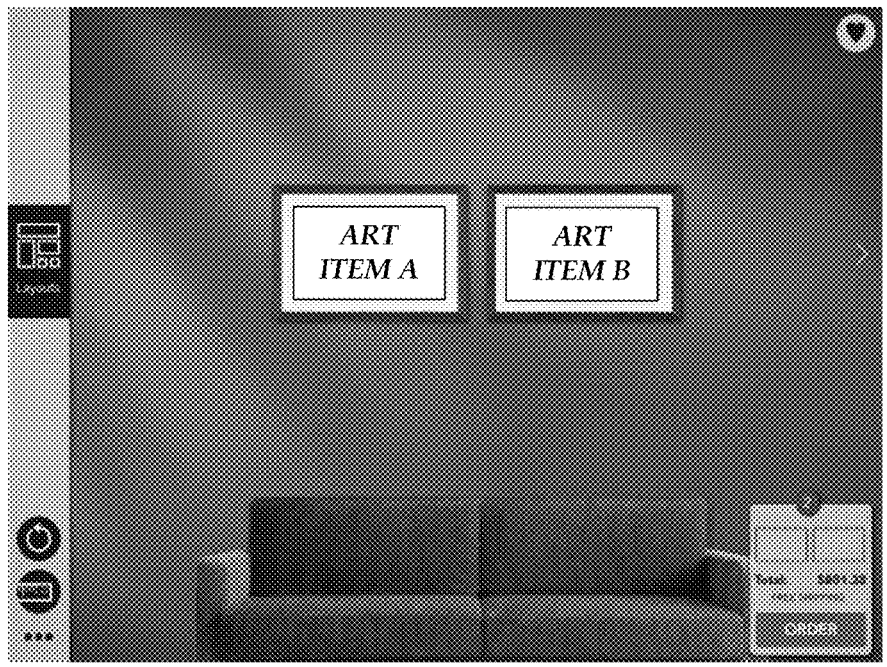
Figure 10B:
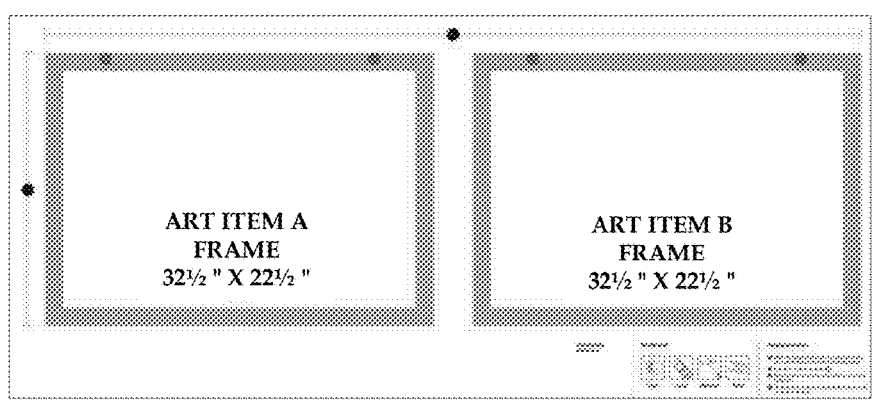

FIG. 6 illustrates an exemplary wall art template that can be generated with a wall art system in accordance with embodiments of the invention. For example, template 600 includes outlines 602 for four items of art from a user curated layout, 602a/602b/602c/602d. Each outline 602 reflects the product style of the item. For example, 602a outline is greater in width to reflect a wood frame mounted item while 602c outline is narrower in width to reflect a metal mounted item. As another example, 602b and 602d outlines are projected to reflect the thickness associated with a canvas mounted item 602b and a wood panel mounted item 602d.

In one embodiment, the template 600 includes marks 604 for hanging the items, where the location of the mark relative to the outline of the item differs depending on the product style of the item. For example the location of the mark 604c is lower relative to the top edge of the item as compared to the location of the marks 604a/604b/604d.

In one embodiment, the template 600 includes information identifying the items. For example, the four illustrated items each include information 606a/606b/606c/606d that identifies whether the item is a custom image 606a/606c, or the title of the art item 606b/606d. In addition, the template 600 can include information identifying the type of product style for each item, such as frame, metal, canvas or wood panel, as well as the dimensions of each item, e.g. 10"×8" and so forth.

In one embodiment, the template 600 includes information identifying the tools that a user will need to hang the items outlined in the template 608, as well as the hanging instructions 610.

In one embodiment, the template 600 includes measurement lines 612 and 614 indicating the overall height and width of the layout of items for which the template was generated. The measurement lines 612/614 can serve as guidelines to help the user accurately position and temporarily affix the template to their wall in preparation for hanging the items of art.

To use the template, the user follows the supplied hanging instructions 610 for transferring the proper positions of the marks for hanging the one or more items of the curated layout of wall art. For example, the user adheres the template using masking tape or other removable fixative after leveling the template to insure accurate hanging of the wall art, and then transfers the nail marks or other hanging indicia to the wall in preparation for the actual hanging of each item.

FIGS. 7A-7B and 8A-8B illustrate an example of two different product styles for a user-selected item of art and how the dynamically generated wall art template differs between the two. For example the template in FIG. 7B reflects the product style and dimensions of the wall art item for a metal-mounted product as contrasted with the template in FIG. 8B, which reflects the product style and dimensions of the wall art item in a frame-mounted product.

FIGS. 9A-9B and 10A-10B illustrate an additional example of two different product styles for a user-selected item of art and how the dynamically generated wall art template differs between the two, this time for a multiple-item curated wall. For example the template in FIG. 9B reflects the product style, relative positions and dimensions of the two wall art items for a metal-mounted product as contrasted with the template in FIG. 10B, which reflects the product style, relative positions and dimensions of the two wall art items in a frame-mounted product.

FIG. 11 is a block diagram overview of a computer system 1100, or device, which may be used with one embodiment of the invention. For example, the system 1100 may be used as a client or a server as shown in FIG. 1. Note that while FIG. 11 illustrates various components of a computer system or device, it is not intended to represent any particular architecture or manner of interconnecting the components; as such details are not germane to the present invention. It will also be appreciated that network computers, various types of user devices, including hand-held computers, mobile devices, cell phones, tablets and other data processing systems, any of which may have fewer components or perhaps more components than illustrated in FIG. 11, may also be used with embodiments of the present invention.

As shown in FIG. 11, the computer system 1100, which is a type of a data processing system, includes a bus or interconnect 1102, which is coupled to one or more microprocessors 1103 and a ROM 1107, a volatile RAM 1105, and a non-volatile memory 1106. The microprocessor 1103 is coupled to cache memory 1104. The bus 1102 interconnects these various components together and also interconnects these components 1103, 1107, 1105, and 1106 to a display controller and display device 1108, as well as to input/output (I/O) devices 1110, which may be mice, keyboards, modems, network interfaces, printers, and other devices, which are well known in the art.

Typically, the input/output devices 1110 are coupled to the system through input/output controllers 1109. The volatile RAM 1105 is typically implemented as dynamic RAM (DRAM) that requires power continuously in order to refresh or maintain the data in the memory. The non-volatile memory 1106 is typically a magnetic hard drive, a magnetic optical drive, an optical drive, or a DVD RAM or other type of memory system that maintains data even after power is removed from the system. Typically, the non-volatile memory will also be a random access memory, although this is not required.

While FIG. 11 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 1102 may include one or more buses connected to each other through various bridges, controllers, and/or adapters, as is well known in the art. In one embodiment, the I/O controller 1109 includes a USB (Universal Serial Bus) adapter for controlling USB peripherals. Alternatively, I/O controller 1109 may include an IEEE-1394 adapter, also known as FireWire adapter, for controlling FireWire devices.

Embodiments of the invention also relate to an apparatus for performing the operations herein, such as a computer program that is stored in a non-transitory computer or machine-readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method comprising:
on a user device having an interactive display:
receiving an image of a wall art environment, the wall art environment comprising furnishings;
displaying on the interactive display a curated layout of one or more items of wall art relative to the wall art environment, customized in accordance with user selections received in the interactive display;
prompting a user to purchase any of the one or more of items of wall art displayed in the curated layout on the interactive display; and
generating a physical customized wall art template on a tangible flexible material suitable for being applied to a wall, wherein the physical customized wall art template includes outlines of actual dimensions of the furnishings in the wall art environment, the physical customized wall art template corresponding to the curated layout of the one or more items of wall art and the wall art environment, customized in accordance with the user selections received in the interactive display, the customized wall art template representing the one or more items of wall art as displayed on the interactive display as the one or more items of wall art would appear on the wall.

2. The computer-implemented method of claim 1, further comprising:
receiving dimensions of one or more furnishings in the wall art environment;
wherein the displayed wall art environment is composed of:
a background, a wall captured in an image displayed in the background, and a foreground, the furnishings captured in an image displayed in the foreground;
wherein the curated layout is positioned on the interactive display to appear as if hung on the wall above the furnishings captured in the image displayed in the foreground; and wherein the physical customized wall art template further comprises outlines of the one or more items of wall art as customized in accordance with the user selections received in the interactive display and outlines of the any one or more features of the wall art environment.

3. The computer-implemented method of claim 2, wherein the outlines of any one or more features of the wall art environment are features displayed in the background of the interactive display, including any one or more of an existing item of wall art already hung in the wall art environment, or an existing feature of the wall art environment, including an architectural feature of a room represented in the wall art environment.

4. The computer-implemented method of claim 2, wherein the outlines of the one or more items of wall art as customized in accordance with the user selections received in the interactive display comprise outlines varying in width and projection to reflect how the one or more items of wall art are customized.

5. The computer-implemented method of claim 1, wherein generating a physical customized wall art template corresponding to the curated layout of the one or more items of wall art customized in accordance with the user selections received in the interactive display includes generating marks to indicate a location for hanging the one or more items of wall art as displayed on the interactive display, including generating marks varying in size and number to reflect how the one or more items of wall art are customized.

6. The computer-implemented method of claim 1, wherein generating a physical customized wall art template corresponding to the curated layout of the one or more items of wall art customized in accordance with the user selections received in the interactive display includes generating measurement lines that reflect an overall height and width of the curated layout of the one or more items of wall art as displayed on the interactive display.

7. A system comprising:
a display device having an interactive display and a processor configured to generate a graphical user interface displayed on the interactive display, wherein the processor is configured to:
receive an image of a wall art environment, the wall art environment comprising furnishings;
display on the interactive display a curated layout of one or more items of wall art relative to the wall art environment, customized in accordance with user selections received in the interactive display;
prompt a user to purchase any of the one or more of items of wall art displayed in the curated layout on the interactive display; and
generate a physical customized wall art template on a tangible flexible material suitable for being applied to a wall, wherein the physical customized wall art template includes outlines of actual dimensions of the furnishings in the wall art environment, the physical customized wall art template corresponding to the curated layout of the one or more items of wall art and the wall art environment, customized in accordance with the user selections received in the interactive display, the physical customized wall art template representing the one or more items of wall art as displayed on the interactive display as the one or more items of wall art would appear on the wall.

8. The system of claim 7, wherein the processor is further configured to:
receive dimensions of one or more of the furnishings in the wall art environment;
wherein the displayed wall art environment is composed of:
a background, a wall captured in the an image displayed in the background, and a foreground, the furnishings captured in the image displayed in the foreground;
wherein the curated layout is positioned on the interactive display to appear as if hung on the wall above the furnishings captured in the image displayed in the foreground; and
wherein the physical customized wall art template further comprises outlines of the one or more items of wall art as customized in accordance with the user selections received in the interactive display and outlines of any one or more features of the wall art environment.

9. The system of claim 8, wherein the outlines of any one or more features of the wall art environment are features displayed in the background of the interactive display, including any one or more of an existing item of wall art already hung in the wall art environment, or an existing feature of the wall art environment, including an architectural feature of a room represented in the wall art environment.

10. The system of claim 8, wherein the processor is configured to generate outlines of the one or more items of wall art as customized in accordance with the user selections received in the interactive display, the physical customized wall art template including outlines varying in width and projection to reflect how the one or more items of wall art are customized.

11. The system of claim 7, wherein the processor is configured to generate a physical customized wall art template corresponding to the curated layout of the one or more items of wall art customized in accordance with the user selections received in the interactive display, the physical customized wall art template including marks to indicate a location for hanging the one or more items of wall art as displayed on the interactive display, the marks varying in size and number to reflect how the one or more items of wall art are customized.

12. The system of claim 7, wherein the processor is configured to generate a physical customized wall art template corresponding to the curated layout of the one or more items of wall art customized in accordance with the user selections received in the interactive display, the physical customized wall art template including measurement lines that reflect an overall height and width of the curated layout of the one or more items of wall art as displayed on the interactive display.

* * * * *